(Model.)
S. B. CRAGIN.
NUT LOCK.
No. 292,627.  Patented Jan. 29, 1884.
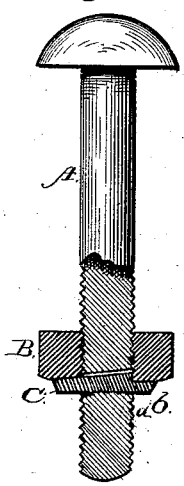
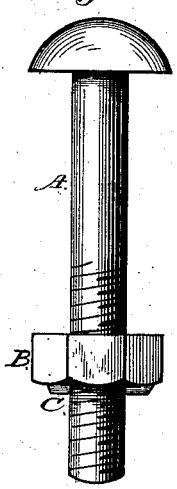
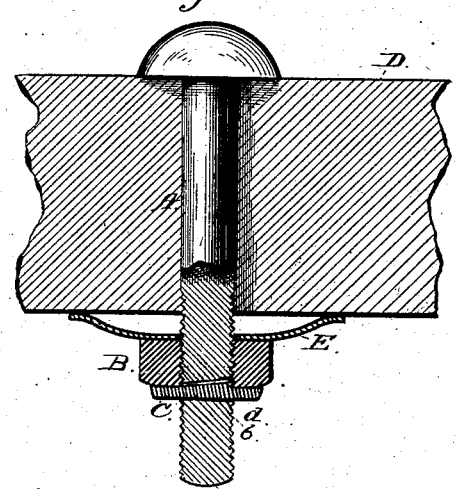
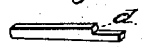
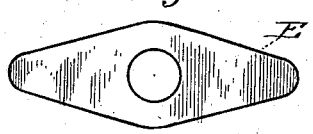
Attest.
J. M. Reynolds
Emmartle
Inventor
Samuel B. Cragin

UNITED STATES PATENT OFFICE.

SAMUEL B. CRAGIN, OF ADA, MINNESOTA, ASSIGNOR OF ONE-THIRD TO IDA L. CRAGIN, OF SAME PLACE.

NUT-LOCK.

SPECIFICATION forming part of Letters Patent No. 292,627, dated January 29, 1884.

Application filed December 4, 1883. (Model.)

*To all whom it may concern:*

Be it known that I, SAMUEL B. CRAGIN, a citizen of the United States, residing at Ada, in the county of Norman and State of Minnesota, have invented certain new and useful Improvements in Nut-Locks, of which the following is a specification, reference being had therein to the accompanying drawings.

My invention relates to the class of nut-locks known as "top nut-locks;" and it consists in the arrangement and construction of the several parts, as will be more fully explained and pointed out in the specification and claims.

The object of my invention is to provide a nut-lock for railroad-rails and other mechanical appliances requiring secure fastenings, which will hold said rails or appliances firmly in place notwithstanding the jarring occasioned by the passing of trains of cars, the changes of temperature, or the wearing and wrenching of the parts secured laterally or longitudinally.

In the drawings similar letters of reference indicate corresponding parts in all of the figures.

Figure 1 is a side view of my invention, partly broken away, showing a sectional view of the parts in place. Fig. 2 is a side view of the same. Fig. 3 is a sectional view, showing the parts in place, with a rail, and a spring interposed between the nut and said rail. Fig. 4 is a side and top view of the pin. Fig. 5 is a top view of a spring which may be used.

A represents the bolt, formed with the diametrical longitudinal slot b. B represents the nut, and C the pin, with notch d. The bolt A is of ordinary construction, except the slot b, which must be made of sufficient length and breadth to admit pin C loosely. The nut B is of the ordinary construction. The pin C is made slightly tapering from the point to the notch d. The slot b is wider at one end than at the other. This shape secures that the taper shall advance into the slot no farther than enough to permit its shoulder to come even with the threads of the bolt, and permit the nut, when screwed back, to pass over the shoulder on the key, and so lock the key in the slot.

In applying my invention, the bolt A is first passed through the rails or objects to be secured, as shown in the drawings, Fig. 3. The nut B is then screwed upon the bolt sufficiently to bring the rails or objects into proper position, and also to uncover slot b, so as to admit pin C. Pin C is then pushed through slot b until notch d falls into the interior of nut B. Nut B is then turned backward part of a revolution and until it engages pin C at notch d. The locking is then complete, as shown in Fig. 2.

A spring, E, may be placed between the nut and rail or objects to be secured for convenience in locking, and also to securely hold the nut in place and prevent disengagement from the pin C, should the parts secured shrink or become loose from any cause.

The bolts may be of any desired length or size, and the lock may be used to secure railroad-rails or other appliances or devices requiring permanent fastenings.

The advantages of my invention are cheapness and simplicity of construction, durability, and ready adaptation to all places where nut-locks are used.

Having fully described my invention, what I claim, and desire to secure by Letters Patent, is—

1. The bolt A, having the slot b, and nut B, in combination with the pin C, having notch d, substantially as described.

2. In a nut-lock, the combination of bolt A, having slot b, nut B, pin C, having notch d, and spring E, substantially as described.

In testimony whereof I affix my signature in presence of two witnesses.

SAMUEL B. CRAGIN.

Witnesses:
E. M. MARBLE,
GEO. P. CRAGIN.